S. C. REYER.
SKEWER.
APPLICATION FILED NOV. 27, 1907.

898,926.

Patented Sept. 15, 1908.

Witnesses

Inventor.
SARAH C. REYER,
By
Attorneys

UNITED STATES PATENT OFFICE.

SARAH C. REYER, OF CARTHAGE, ILLINOIS.

SKEWER.

No. 898,926.　　　Specification of Letters Patent.　　　Patented Sept. 15, 1908.

Application filed November 27, 1907. Serial No. 404,076.

*To all whom it may concern:*

Be it known that I, SARAH C. REYER, citizen of the United States, residing at Carthage, in the county of Hancock and State of Illinois, have invented certain new and useful Improvements in Skewers, of which the following is a specification.

The object of the present invention has been the provision of a novel meat skewer which operates in an effective manner to hold the various portions of the meat closely together while being roasted or otherwise cooked, and which owing to its peculiar design can be easily and quickly removed from the meat without in any manner mutilating or disfiguring the same.

Figure 2:
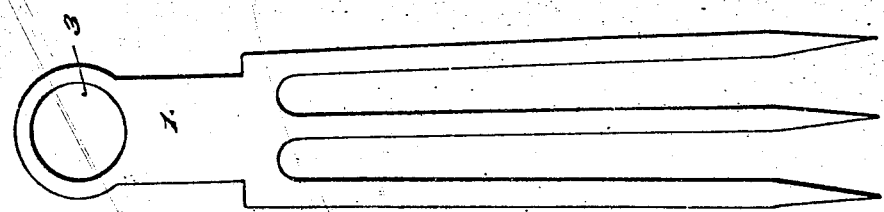
Figure 1:
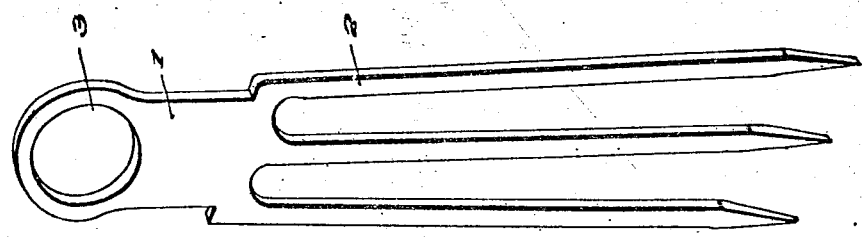

For a full description of the invention and the merits thereof and also to acquire a knowledge of the details of construction and the means for effecting the result, reference is to be had to the following description and accompanying drawings, in which:

Figure 1 is a perspective view of a meat skewer embodying the invention. Fig. 2 is a front view of the same.

Corresponding and like parts are referred to in the following description and indicated in all the views of the drawings by the same reference characters.

The improved skewer embodied by the present invention is designed to be formed from a single piece of wire or sheet material, and in the present instance is shown as stamped from a piece of sheet material having a sufficient thickness to impart the necessary strength and rigidity to the skewer.

Referring to the drawing the numeral 1 designates the shank of the skewer, the said shank being provided at one end with a plurality of prongs 2 which bear a parallel and spaced relation to each other. In the present instance there are three of the prongs 2, one of which coincides in direction with the longitudinal axis of the shank while the other two are offset from the shank upon opposite sides thereof. These prongs 2 are also shown in the drawing as having a square or rectangular cross section and as having the extremities thereof pointed so as to be readily inserted in the meat. The opposite end of the shank is enlarged and provided with an opening 3 designed to receive the finger of the operator or a suitable tool when withdrawing the skewer from the meat.

From the foregoing description it will be readily apparent that the prongs 2 can be readily embedded in a roast or other piece of meat in such a manner as to hold the various portions thereof closely together during the cooking operation and prevent any bulging or separation of the parts of the meat such as would cause the same to cook unevenly or become dry and tasteless so as to necessitate the waste thereof. After the meat has been roasted or cooked in the desired manner the opening 3 in the enlarged end of the shank may be engaged by the finger of the operator or by any suitable means and sufficient force applied thereto to withdraw the skewer from the meat without in any manner mutilating or disfiguring the meat to such an extent as to prevent the same from being carved.

Having thus described the invention, what is claimed as new is:

The herein described meat skewer stamped from a single piece of material and comprising a shank provided at one end with an enlargement having an opening formed therein to permit of ready withdrawal of the skewer while the opposite end is provided with three parallel and spaced prongs, the middle prong being arranged in alinement with the longitudinal axis of the skewer while the remaining prongs are offset therefrom.

In testimony whereof I affix my signature in presence of two witnesses.

SARAH C. REYER. [L. S.]

Witnesses:
　MATTIE MADDEN,
　AGALLES W. O'HARRA.